(12) United States Patent
Tsuchiya et al.

(10) Patent No.: US 8,734,537 B2
(45) Date of Patent: May 27, 2014

(54) BATTERY PRODUCTION METHOD (75) Inventors: Kenji Tsuchiya, Toyota (JP); Takeshi Uehara, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 274 days.

(21) Appl. No.: 12/812,118

(22) PCT Filed: Dec. 17, 2008

(86) PCT No.: PCT/JP2008/072907
§ 371 (c)(1),
(2), (4) Date: Jul. 8, 2010

(87) PCT Pub. No.: WO2009/093397
PCT Pub. Date: Jul. 30, 2009

(65) Prior Publication Data
US 2010/0287763 A1 Nov. 18, 2010

(30) Foreign Application Priority Data
Jan. 22, 2008 (JP) ................................. 2008-011851

(51) Int. Cl.
*H01M 2/00* (2006.01)
(52) U.S. Cl.
USPC ........................ 29/623.1; 429/133; 429/164
(58) Field of Classification Search
USPC ........ 29/623.1–623.5; 429/400–535, 94, 209, 429/133, 164, 233–245
See application file for complete search history.

(56) References Cited

U.S. PATENT DOCUMENTS

| 7,763,377 B2* | 7/2010 | Kozuki | 429/122 |
| 7,867,644 B2* | 1/2011 | Aota et al. | 429/94 |
| 2007/0026307 A1* | 2/2007 | Kim | 429/161 |
| 2009/0233174 A1* | 9/2009 | Okabe et al. | 429/223 |

FOREIGN PATENT DOCUMENTS

| CN | 1716658 | | 1/2006 | |
| JP | 2000-231913 | * | 8/2000 | H01M 2/22 |
| JP | 2000231913 A | * | 8/2000 | H01M 2/22 |
| JP | 2003-249423 | | 9/2003 | |
| JP | 2003249423 A | * | 9/2003 | H01G 9/058 |
| JP | 2006-278184 | | 10/2006 | |

OTHER PUBLICATIONS

Machine English Translation of JP 2000-231913 to Goro.*
International Search Report for PCT/JP2008/072907, mailed Feb. 24, 2009.

* cited by examiner

*Primary Examiner* — Milton I Cano
*Assistant Examiner* — Michael Dignan
(74) *Attorney, Agent, or Firm* — Finnegan, Henderson, Farabow, Garrett & Dunner, LLP (57) ABSTRACT

A method for producing a battery comprises a deformation step for moving a first metal foil forming a pair of perpendicularly intersecting portions of a first metal, respectively, toward the outside in a second radial direction while enlarging the inside diameter, in the second radial direction, of a first metal winding part by making a force act on the pair of perpendicularly intersecting portions of a first metal toward the outside in the second radial direction, and a resistance welding step for pressing a pair of first metal welding portions toward the inside in a first radical direction under a state where the first terminal welding part of a first current collecting terminal member is arranged on the radial by inside of the first metal winding part after the first metal winding part is deformed.

4 Claims, 9 Drawing Sheets

BATTERY PRODUCTION METHOD

CROSS-REFERENCE TO RELATED APPLICATIONS

This application is a national phase application of International Application No. PCT/JP2008/072907, filed Dec. 17, 2008, and claims the priority of Japanese Application No. 2008-011851, filed Jan. 22, 2008, the contents of both of which are incorporated herein by reference.

TECHNICAL FIELD

The present invention relates to a battery and a production method therefor.

BACKGROUND ART

There have been proposed various types of batteries each including an electrode body having: a power generating part made by laminating a first electrode-forming portion having a first electrode mixture layer of a first electrode sheet and a second electrode sheet by interposing a separator therebetween and winding such a laminated body about an axis line into a cylindrical form; and a first metal winding part (a portion formed with no electrode mixture layer) constituted of only a first metal portion made of a first metal foil in a wound form, the first metal winding part being adjacent to the power generating part (for example, see Patent Literature 1). A cylindrical battery disclosed in Patent Literature 1 is provided with a current collecting terminal (a first current collecting terminal member) for collecting electric charge of a first electrode sheet, the current collecting terminal including a portion (a first terminal welding part) being located on the radial inside of the portion with no electrode mixture layer (the first metal winding part) and welded to the first metal winding part.

CITATION LIST

Patent Literature

Patent Literature 1: JP-A-2000-231913

SUMMARY OF INVENTION

Technical Problem

Meanwhile, Patent Literature 1 discloses a method achieved by radially inward pressing a pair of first metal welding portions of a cylindrical first metal winding part respectively, and welding the first metal welding portions and a first terminal welding part placed on the radial inside of the first metal winding part while holding the first metal welding portions in pressure contact with the first terminal welding part. According to this method, when the first metal welding portions are pressed radially inward to press against the first terminal welding part, parts of the first metal foil may buckle at first metal perpendicularly intersecting portions of the first metal winding part and hence the buckled part of the metal foil may contact an adjacent part of the metal foil. It is to be noted that the first metal winding part does not include a second electrode plate and a separator between the parts of the first metal foil and thus the parts of the first metal foil forming the first metal winding part are apart from each other before pressing.

If the parts of the first metal foil forming the first metal perpendicularly intersecting portion buckle, the parts caused to contact with each other due to buckling are apt to generate spatters during resistance welding, causing a part (foreign matters) of the first metal foil to scatter and adhere to the electrode body. Thus, the foreign matters may enter in a battery, leading to a decrease in reliability of the battery. Furthermore, a shunt of welding current at the contact portions resulting from buckling may cause welding failures between the first metal winding part and the first terminal welding part. This also may deteriorate the battery reliability.

The present invention has been made to solve the above problems and has a purpose to provide a highly reliable battery produced by preventing entrance of foreign matters in the battery and including a first metal winding part and a first terminal welding part both being appropriately welded to each other, and a production method therefor.

Solution to Problem

To achieve the above purpose, the present invention provides a method of producing a battery comprising an electrode body and a first current collecting terminal member, the electrode body being provided with: a first electrode sheet having a first electrode mixture layer provided on a surface of a strip-shaped first metal foil, the sheet including: a first electrode-forming portion extending along one side of the first metal foil extending in a longitudinal direction and including the first metal foil and the first electrode mixture layer; and a first metal portion extending adjacently to the first electrode-forming portion and along the one side along the longitudinal direction and consisting of the first metal foil without having the first electrode mixture layer; a strip-shaped second electrode sheet; and a strip-shaped separator, the electrode body including: a power generating part in which the first electrode-forming portion of the first electrode sheet and the second electrode sheet are laminated by interposing the separator therebetween and wound around an axis line into a cylindrical form; and a first metal winding part in which the first metal portion is wound, the first metal winding part being adjacent to the power generating part, and the first current collecting terminal member being configured to collect electric charge of the first electrode sheet and provided with a first terminal welding part placed on a radial inside of the first metal winding part and welded to the first metal winding part, the method comprising: a deforming step of deforming the first metal winding part of the electrode body including: the power generating part; and the first metal winding part in which the first metal portion is wound in a cylindrical form, the deforming step including: when a pair of portions of the first metal winding part to be welded to the first terminal welding part of the first current collecting terminal member, the portions being opposed to each other in a first radial direction of the first metal winding part, is a pair of first metal welding portions, and a pair of portions of the first metal winding part opposed to each other in a second radial direction perpendicular to the first radial direction is a pair of first metal perpendicularly intersecting portions, exerting an outward force in the second radial direction on the pair of metal perpendicularly intersecting portions to enlarge the inside diameter of the first metal winding part in the second radial direction and move parts of the first metal foil forming the pair of first metal perpendicularly intersecting portions outward in the second radial direction respectively, and a resistance welding step of pressing the pair of first metal welding portions inward in the first radial direction while the first terminal welding part of the first current collecting terminal member is placed on the radial inside of the deformed first metal winding part, and resistance-welding the first metal welding portions and the first terminal welding part to each other while holding the pair of first metal welding portions in pressure contact with the first terminal welding part.

According to the production method of the invention, before the pair of first metal welding portions are pressed against the first terminal welding part in the resistance welding step, an outward force in the second radial direction is applied in advance to the pair of first metal perpendicularly intersecting portions in the deforming step to move the parts of the first metal foil forming the pair of first metal perpendicularly intersecting portions outward in the second radial direction respectively. In the later resistance welding step, accordingly, when the pair of first metal welding portions are pressed inward in the first radial direction to bring the pair of first metal welding portions in pressure contact with the first terminal welding part, the parts of the first metal foil forming the pair of metal perpendicularly intersecting portions are allowed to easily move together outward in the second radial direction.

According to such deforming technique, the first metal winding part is unlikely to buckle during deforming. Furthermore, the parts of the first metal foil forming the pair of first metal perpendicularly intersecting portions are respectively moved outward in the second radial direction, thus moving the pair of metal welding portions inward in the first radial direction, bringing the first metal winding part closer to the first terminal welding part.

In the resistance welding step, accordingly, when the pair of first metal welding portions are pressed inward in the first radial direction to bring the pair of first metal welding portions in pressure contact with the first terminal welding part, the parts of the first metal foil forming the first metal winding part can be prevented from buckling. This makes it possible to prevent adhesion of foreign matters to the electrode body caused by the occurrence of spatters, thereby avoiding entrance of the foreign matters into the battery. It is further possible to prevent welding failures between the first metal welding portions and the first terminal welding part due to the influence of a shunt of welding current. Therefore, the production method of the invention can produce a highly reliable battery.

One example of the deforming step is achieved by deforming the cylindrical first metal winding part into an elliptic form having an inside diameter in the first radial direction shorter than an inside diameter in the second radial direction.

Furthermore, in the above battery production method, preferably, the first terminal welding part has a shape having such a cross section, taken along a direction perpendicular to the axis line while the first terminal welding part is placed on the radial inside of the first metal winding part, as that a maximum size in the second radial direction is larger than the inside diameter of the first metal winding part before deformed and a maximum size in the first radial direction is smaller than the inside diameter of the first metal winding part before deformed, and the deforming step including inserting the first terminal welding part in the radial inside of the first metal winding part.

In the production method of the invention, the first terminal welding part is inserted in the radial inside of the first metal winding part to exert an outward force in the second radial direction on the pair of first metal perpendicularly intersecting portions, thereby enlarging the inside diameter of the first metal winding part in the second radial direction and moving the parts of the first metal foil forming the pair of metal perpendicularly intersecting portions respectively outward in the second radial direction. This method is therefore more preferable because easier and faster deforming of the first metal winding part can be achieved as compared with deforming of the first metal winding part using an additional deforming jig and the like.

Furthermore, in the above battery production method, preferably, the first terminal welding part has a cross section taken along the second radial direction so as to pass the axis line while the first terminal welding part is placed on the radial inside of the first metal winding part, the cross section having such a size in the second radial direction as that the size at a side closest to the power generating part is equal to or less than the inside diameter of the first metal winding part before deformed, the size increases as farther from the power generating part in the axis line direction, and the size at a farthermost side from the power generating part in the axis line direction is larger than the inside diameter of the first metal winding part before deformed.

Because of the use of the first current collecting terminal member including the first terminal welding part having the above shape, the first terminal welding part can be smoothly inserted in the radial inside of the first metal winding part. Furthermore, as the first terminal welding part is inserted in the first metal winding part, the force applied on the first metal winding part gradually increases. Therefore, the parts of the first metal foil forming the first metal winding part are less likely to break than the case where a large force is applied abruptly.

Furthermore, one of the above battery production methods, preferably, further comprises: after the deforming step and before the resistance welding step, a foil collecting step of pressing the pair of first metal welding portions inward in the first radial direction while the first terminal welding part is placed on the radial inside of the deformed first metal winding part to collect parts of the first metal foil forming the first metal welding portions inward in the first radial direction while decreasing clearances between the parts of the first metal foil in the first radial direction.

Before resistance welding, the parts of the first metal foil forming the first metal welding portions are collected in advance inward in the first radial direction while reducing the clearances or spaces between the parts of the first metal foil in the first radial direction, thereby allowing more appropriate resistance welding. In particular, in the later resistance welding step, the first metal winding part is unlikely to be deformed when the first metal welding portions are pressed inward in the first radial direction. Accordingly, this method is more preferable in further preventing buckling of the first metal foil.

In the deforming step, before the foil collecting step, the parts of the first metal foil forming the first metal perpendicularly intersecting portions are moved outward in the second radial direction. In the foil collecting step, therefore, when the first metal welding portions are pressed inward in the first radial direction, the parts of the first metal foil forming the first metal perpendicularly intersecting portions are easily moved together outward in the second radial direction. Accordingly, it is also possible to prevent the first metal foil from buckling even in the foil collecting step.

Furthermore, in the above battery production method, preferably, the first terminal welding part has a shape formed with a portion recessed inward in the first radial direction as compared with other portions in a cross section taken along the direction perpendicular to the axis line while the first terminal welding part is placed on the radial inside of the first metal winding part, the recessed portion being to be welded to the first metal welding portions of the first metal winding part, and the foil collecting step includes pressing the first metal welding portions inward in the first radial direction to bring the first metal welding portions in pressure contact with the recessed portion of the first terminal welding part.

In the foil collecting step, even when the first metal welding portions are pressed inward in the first radial direction to collect the parts of the first metal foil forming the first metal welding portions inward in the first radial direction while reducing the clearances between the parts of the first metal foil in the first radial direction, the parts of the first metal foil forming the first metal welding portions are apt to elastically move outward in the first radial direction due to spring back.

However, according to the production method of the invention, the first current collecting terminal member includes the first terminal welding part shaped to have the portion recessed inward in the first radial direction as compared with other portions, the recessed portion being to be welded to the first metal welding portions of the first metal winding part when the first terminal welding part is taken along the direction perpendicular to the axis line while the first terminal welding part is placed on the radial inside of the first metal winding part. Then, the first metal welding portions are pressed inward in the first radial direction to bring the first metal welding portions in pressure contact with the recessed portion of the first terminal welding part. Thus, even when the first metal foil causes outward spring back in the first radial direction, the parts of the first metal foil forming the first metal welding portions can appropriately be collected inward in the first radial direction.

Another aspect of the invention provides a battery comprising an electrode body and a first current collecting terminal member, the electrode body being provided with: a first electrode sheet having a first electrode mixture layer provided on a surface of a strip-shaped first metal foil, the sheet including: a first electrode-forming portion extending along one side of the first metal foil extending in a longitudinal direction and including the first metal foil and the first electrode mixture layer; and a first metal portion extending adjacently to the first electrode-forming portion and along the one side along the longitudinal direction and consisting of the first metal foil without having the first electrode mixture layer; a strip-shaped second electrode sheet; and a strip-shaped separator, the electrode body including: a power generating part in which the first electrode-forming portion of the first electrode sheet and the second electrode sheet are laminated by interposing the separator therebetween and wound around an axis line into a cylindrical form; and a first metal winding part in which the first metal portion is wound, the first metal winding part being adjacent to the power generating part, and the first current collecting terminal member being configured to collect electric charge of the first electrode sheet and provided with a first terminal welding part placed on a radial inside of the first metal winding part and welded to the first metal winding part, wherein when a pair of portions of the first metal winding part welded to the first terminal welding part of the first current collecting terminal member and opposed to each other in a first radial direction of the first metal winding part is a pair of first metal welding portions, and a pair of portions of the first metal winding part opposed to each other in a second radial direction perpendicular to the first radial direction is a pair of first metal perpendicularly intersecting portions, in a cross section taken along a direction perpendicular to the axis line to pass the first metal welding portions, the first metal winding part has an outside diameter in the first radial direction smaller than an outside diameter in the second radial direction, and each part of the first metal foil forming the first perpendicularly intersecting portions is curved to bulge outward in the second radial direction.

The battery of the invention is configured such that the first terminal welding part placed on the radial inside of the first metal winding part and the first metal welding portions of the first metal winding part are resistance-welded to each other. Furthermore, in the cross section of the first metal winding part taken along the direction perpendicular to the axis line to pass the first metal welding portions, the outside diameter of the first metal winding part in the first radial direction in which the pair of metal welding portions are opposed to each other is determined to be smaller than the outside diameter of the first metal winding part in the second radial direction perpendicular to the first radial direction.

Such battery is produced in such a manner that the pair of first metal welding portions are pressed respectively radially inward while the first terminal welding part is placed on the radial inside of the first metal winding part and the first metal welding portions are resistance-welded to the first terminal welding part while holding the pair of first metal welding portions in pressure contact with the first terminal welding part. However, when the first metal welding portions are pressed radially inward to press against the first terminal welding part, conventionally, a part or parts of the first metal foil might buckle at the first metal perpendicularly intersecting portions of the first metal winding part and hence come into contact with an adjacent part or parts of the metal foil. If the part of the first metal foil at the first metal perpendicularly intersecting portion buckles, the parts caused to contact with each other due to buckling may generate spatters during the resistance welding, causing a part (foreign matters) of the first metal foil to scatter and adhere to the electrode body. Furthermore, a shunt of welding current in the portions resulting from buckling may cause welding failures between the first metal winding part and the first terminal welding part. This also may deteriorate the battery reliability.

On the other hand, in the battery of the invention, each of the parts of the first metal foil forming the first metal perpendicularly intersecting portions is curved to bulge outward in the second radial direction. Specifically, the first metal foil does not buckle at the first metal perpendicularly intersecting portions. Thus, the first metal welding portions and the first terminal welding part are resistance-welded to each other while preventing adhesion of foreign matters to the electrode body caused by the occurrence of spatters and welding failures due to a shunt of welding current between the first metal welding portions and the first terminal welding part. From the above, the battery of the invention can be achieved as a highly reliable battery by restraining entrance of the foreign matters into the battery and appropriately welding the first metal winding part and the first terminal welding part to each other.

REFERENCE SIGNS LIST

1 Battery
10 First electrode sheet
11 First metal foil
12 First electrode mixture layer
13 First metal part
14 First electrode-forming portion
20 Second electrode sheet
30 Separator
40 Electrode body
42 Power generating part
44 First metal winding part
44b, 44c First metal welding portion
44d, 44e First metal perpendicularly intersecting portion
50 First current collecting terminal member
53 First terminal welding part
53g Recess
P Axis line
X First radial direction
Y Second radial direction

DESCRIPTION OF EMBODIMENTS

A detailed description of a preferred embodiment of a battery 1 embodying the present invention will now be given referring to the accompanying drawings.

Figure 1:
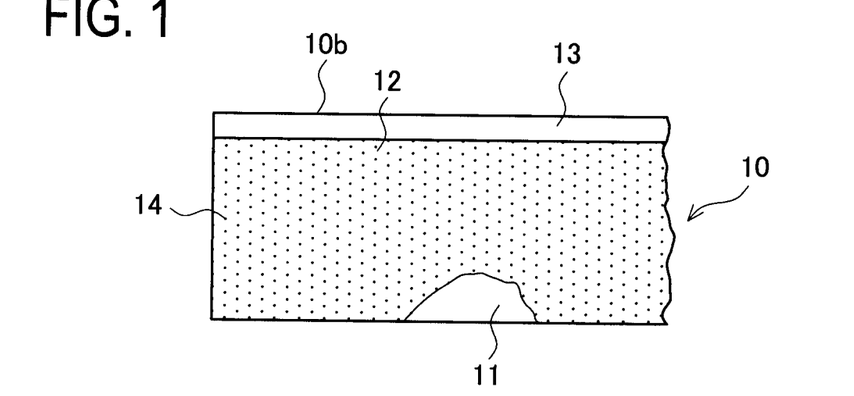
FIG. 1 is a view showing a first electrode sheet in an embodiment.

As shown in FIG. 1, a first electrode sheet 10 in which a first electrode mixture layer 12 is provided on a surface of a strip-shaped first metal foil 11 is first prepared. This first electrode sheet 10 includes a first electrode-forming portion 14 and a first metal portion 13 adjacent to the first electrode-forming portion 14. The first electrode-forming portion 14 extends along one side 10b of the first metal foil 11 extending in a longitudinal direction (a lateral direction in FIG. 1) and is constituted of a part of the first metal foil 11 and a first electrode mixture layer 12. The first metal portion 13 is made of the first metal foil 11 without including the first electrode mixture layer 12 and extends along the side 10b in the longitudinal direction.

The first metal foil 11 is for example made of copper. The first electrode mixture layer 12 is constituted of a first electrode active material, a binder, and others. The first electrode active material is for example lithium nickel oxide.

Figure 2:
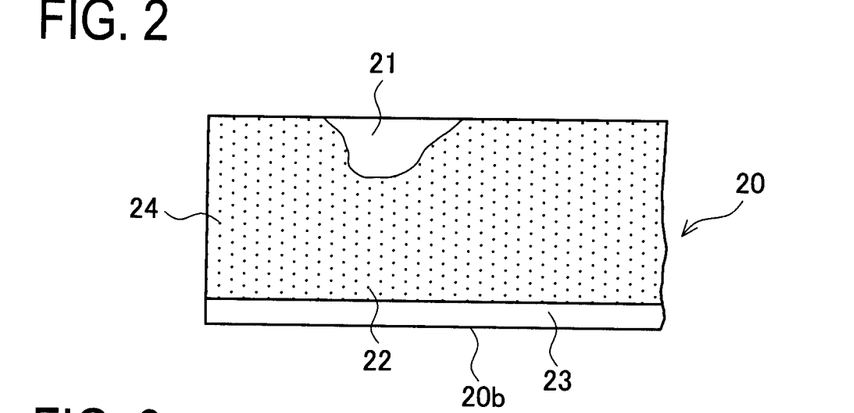
FIG. 2 is a view showing a second electrode sheet in the embodiment.

As shown in FIG. 2, furthermore, a second electrode sheet 20 in which a second electrode mixture layer 22 is provided on a surface of a strip-shaped second metal foil 21 is prepared. This second electrode sheet 20 includes a second electrode-forming portion 24 and a second metal portion 23 adjacent to the second electrode-forming portion 24. The second electrode-forming portion 24 extends along one side 20b of the second metal foil 21 extending in a longitudinal direction (a lateral direction in FIG. 2) and includes a second metal foil 21 and a second electrode mixture layer 22. The second metal portion 23 is made of the second metal foil 21 without including the second electrode mixture layer 22 and extends along the side 20b in the longitudinal direction.

The second metal foil 21 is for example made of aluminum. The second electrode mixture layer 22 is constituted of a second electrode active material, a binder, and others. The second electrode active material is for example natural graphite.

Figure 3:
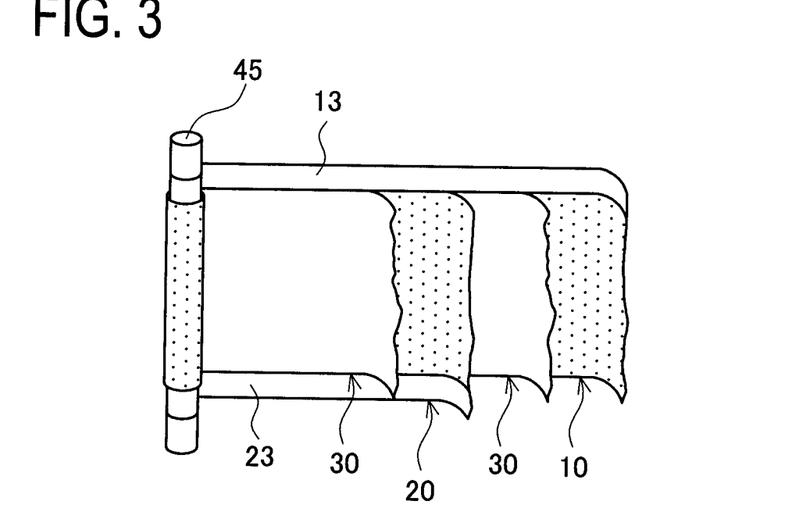
FIG. 3 is a view to explain a step of laminating the first electrode sheet, the second electrode sheet, and a separator and winding them into a cylindrical form.

As shown in FIG. 3, successively, the first electrode sheet 10, a separator 30, the second electrode sheet 20, and another separator 30 are laminated in this order. Concretely, they are laminated in such a manner that the first metal portion 13 of the first electrode sheet 10 and the second metal portion 23 of the second electrode sheet 20 are located opposite in a width direction (a vertical direction in FIG. 3) so that the first metal portion 13 does not overlap the separators 30 and the second electrode sheet 20 and the second metal portion 23 does not overlap the separators 30 and the first electrode sheet 10. Then, the laminated first electrode sheet 10, separator 30, second electrode sheet 20, and separator 30 are wound in a cylindrical form around a cylindrical winding core 45.

Figure 4:
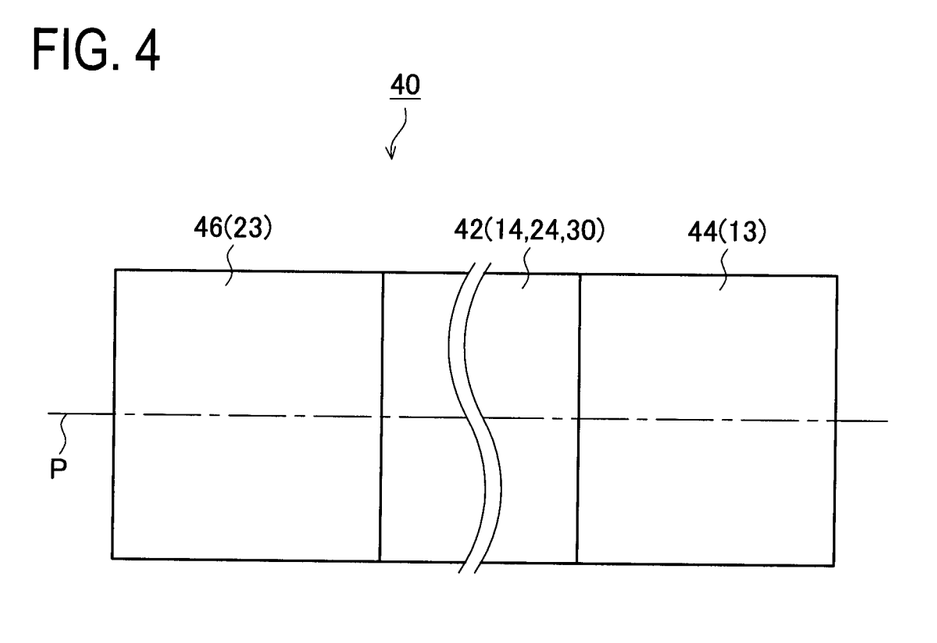
FIG. 4 is a side view of an electrode body in which the first electrode sheet, the second electrode sheet, and the separator are laminated and wound in the cylindrical form.

After the above winding, the winding core 45 is removed. As shown in FIG. 4, the electrode body 40 is thus formed to include a power generating part 42, a first metal winding part 44, and a second metal winding part 46. The power generating part 42 includes the first electrode-forming portion 14 of the first electrode sheet 10 and the second electrode-forming portion 24 of the second electrode sheet 20, both electrode-forming portions 14 and 24 being laminated by interposing the separator 30 therebetween and wound around the axis line P into a cylindrical form. The first metal winding part 44 is adjacent to the power generating part 42 on one side (on a right side in FIG. 4) in the axis direction and is constituted of the wound first metal portion 13. The second metal winding part 46 is adjacent to the power generating part 42 on the other side (on a left side in FIG. 4) in the axis direction and is constituted of the second metal portion 23.

Figure 5:
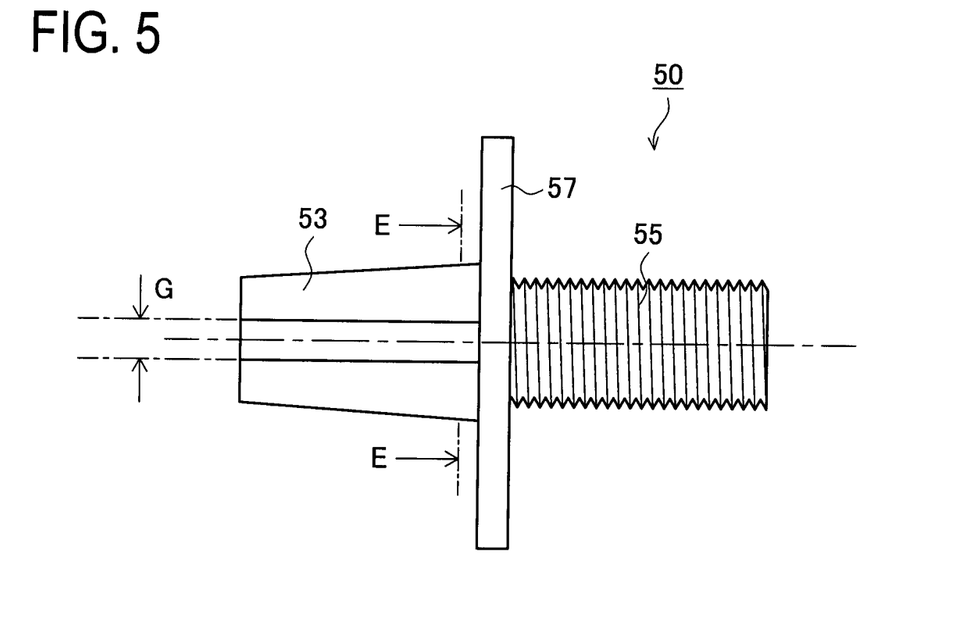
FIG. 5 is a plan view of a first current collecting terminal member in the embodiment.

As shown in FIG. 5, a first current collecting terminal member (a "terminal member") 50 is prepared for collecting electric charge of the first electrode sheet 10. This terminal member 50 includes a first terminal welding part 53 to be placed on the radial inside of the first metal winding part 44 and welded to the first metal winding part 44, a screw part 55 formed with male threads, and a flange part 57 located between the first terminal welding part 53 and the screw part 55. The terminal member 50 is preferably made of the same material as that of the first metal foil 11. For example, when the first metal foil 11 is made of a copper foil, the terminal member 50 is also preferably made of copper.

Figures 6, 7:
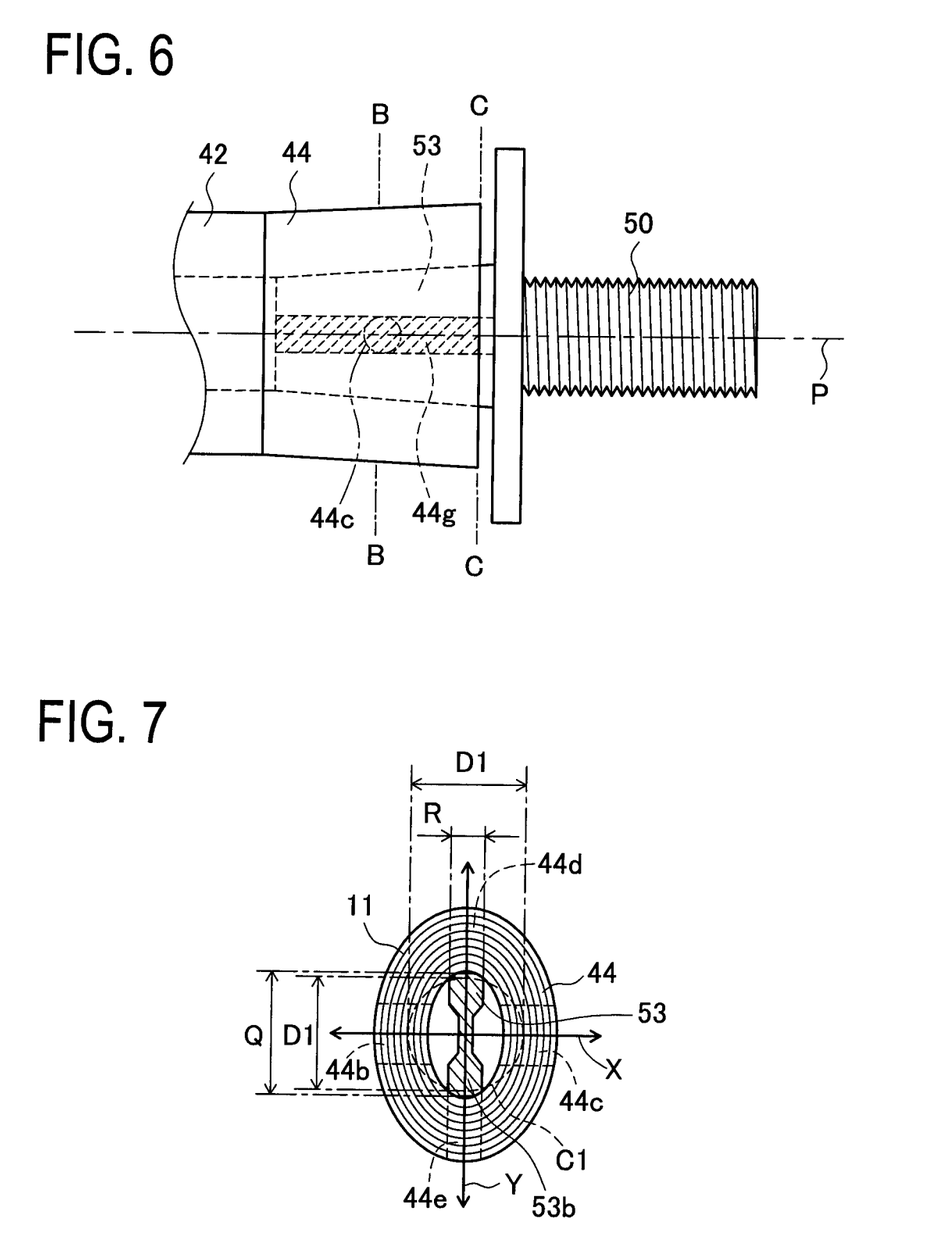
FIG. 6 is a view showing a state where a first terminal welding part is inserted and placed on the radial inside of a first metal winding part, thereby deforming the first metal winding part.
FIG. 7 is a sectional view of the first metal winding part after deformed, taken along a line B-B in FIG. 6.

In a deforming step, subsequently, as shown in FIG. 6, the first terminal welding part 53 of the terminal member 50 is inserted in the radial inside of the first metal winding part 44, thereby deforming the first metal winding part 44.

Herein, FIG. 7 is a sectional view (taken along a line B-B in FIG. 6) of the first metal winding part 44 taken along a direction perpendicular to the axis line P, in which the first terminal welding part 53 is placed inside in the radial direction of the winding part 44 (see FIG. 6). As shown in FIG. 7, the winding part 44 includes a pair of first metal welding portions 44b and 44c to be welded to the first terminal welding part 53. The first metal welding portion 44b and the first metal welding portion 44c are opposed to each other in a first radial direction X of the winding part 44. Furthermore, the winding part 44 includes a pair of first metal perpendicularly intersecting portions 44d and 44e opposed to each other in a second radial direction Y perpendicular to the first radial direction X.

Figure 8:
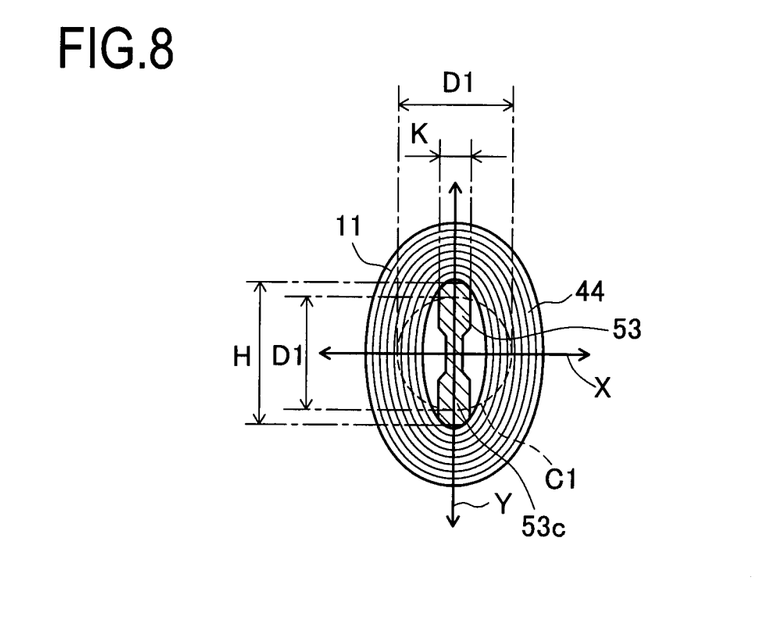
FIG. 8 is a sectional view of the first metal winding part after deformed, taken along a line C-C in FIG. 6.

FIG. 8 shows a sectional view taken along a line C-C in FIG. 6. In FIGS. 7 and 8, the inner periphery C1 of the first metal winding part 44 in which the first terminal welding part 53 is not yet placed on the radial inside of the winding part 44 (i.e., before deformation thereof) is indicated by a broken line.

As shown in FIG. 7, when the first terminal welding part 53 placed on the radial inside of the first metal winding part 44 is viewed in section taken along a perpendicular direction to the axis line P, the first terminal welding part 53 has a shape including a section 53b having a maximum size Q in the second radial direction Y is larger than an inside diameter D1 of the not-yet-deformed winding part 44 and a maximum size R in the first radial direction X is smaller than the inside diameter D1 of the not-yet-deformed winding part 44. As shown in FIG. 8, furthermore, when the first terminal welding part 53 placed on the radial inside of the winding part 44 is viewed in section taken along in a perpendicular direction to the axis line P, the first terminal welding part 53 has a shape including a section 53c having a maximum size H in the second radial direction Y is larger than the inside diameter D1 of the not-yet-deformed winding part 44 and a maximum size K in the first radial direction X is smaller than the inside diameter D1 of the not-yet-deformed winding part 44.

Accordingly, the first terminal welding part 53 having the above shape is inserted in the radial inside of the first metal winding part 44, exerting a radially-outward force on the first metal perpendicularly intersecting portion 44d in the second radial direction (upward in FIG. 7) and exerting a radially-outward force on the first metal perpendicularly intersecting portion 44e in the second radial direction (downward in FIG. 7). This can enlarge the inside diameter of the first metal winding part 44 in the second radial direction. Thus, the parts of the first metal foil 11 forming the perpendicularly intersecting portion 44d can be moved outward in the second radial direction (upward in FIG. 7) and the parts of the first metal foil 11 forming the perpendicularly intersecting portion 44e can be moved outward in the second radial direction (downward in FIG. 7).

In a foil collecting step and a resistance welding step mentioned later, when the pair of first metal welding portions 44b and 44c are pressed inward in the first radial direction to bring the pair of first metal welding portions 44b and 44c in pressure contact with the first terminal welding part 53, the above deformed state allows the parts of the first metal foil 11 forming the pair of first metal perpendicularly intersecting portions 44d and 44e to easily move together outward in the second radial direction.

According to the deforming method in the present embodiment, the first metal winding part 44 is unlikely to buckle during deformation. In addition, when the parts of the first metal foil 11 forming the pair of first metal perpendicularly intersecting portions 44d and 44e are moved outward together in the second radial direction, the pair of first metal welding portions 44b and 44c are moved inward in the first radial direction. Thus, the first metal welding portions 44b and 44c can be brought close to the first terminal welding part 53.

In the foil collecting step and the resistance welding step mentioned later, while the pair of first metal welding portions 44b and 44c are pressed inward in the first radial direction to be pressed against the first terminal welding part 53, the first metal foil 11 forming the first metal winding part 44 can be prevented from buckling. In the deforming step in the present embodiment, the cylindrical first metal winding part 44 can be deformed into an elliptic form having an inside diameter in the first radial direction X shorter than an inside diameter in the second radial direction Y (see FIGS. 7 and 8).

Figure 9:
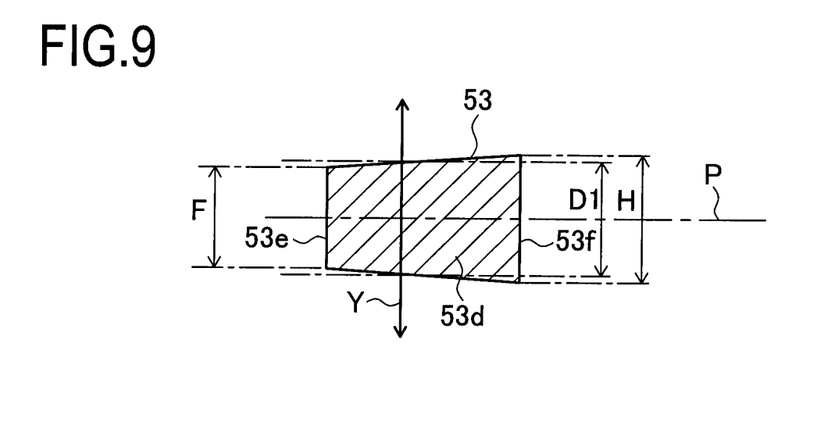
FIG. 9 is a sectional view of the first terminal welding part taken along a second radial direction so as to pass an axis line of a power generating part while the first terminal welding part is placed on the radial inside of the first metal winding part.

Herein, FIG. 9 shows a section 53d of the first terminal welding part 53 placed on the radial inside of the first metal winding part 44 and taken along the second radial direction so as to pass the axis line P. As shown in FIG. 9, the size of the section 53d in the second radial direction Y is determined such that a size F at a side 53e closest to the power generating part 42 is equal to or less than the inside diameter D1 of the not-yet-deformed first metal winding part 44. The size of the section 53d in the second radial direction Y is larger as it is farther from the power generating part 42 in the axis direction (it is closer to a right side along the axis line P in FIG. 9). A size H at a farthest side 53f from the power generating part 42 in the axis direction is larger than the inside diameter D1 of the not-yet-deformed first metal winding part 44.

The use of the first current collecting terminal member 50 including the first terminal welding part 53 having the above shape makes it easy to smoothly insert the welding part 53 in the radial inside of the first metal winding part 44. Additionally, as the welding part 53 is inserted in the winding part 44, the force acting on the winding part 44 is gradually increased. Accordingly, the parts of the first metal foil 11 forming the winding part 44 are less broken as compared with when a large force is abruptly applied thereon.

In the foil collecting step, thereafter, while the first terminal welding part 53 is placed on the radial inside of the deformed first metal winding part 44, the first metal welding portions 44b, 44c are pressed inward in the first radial direction.

Figure 10:
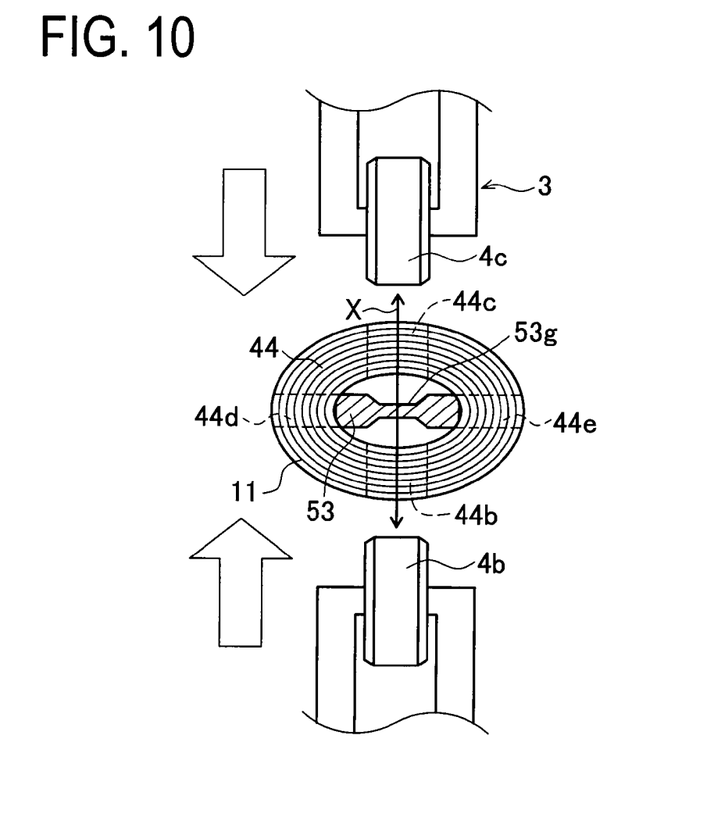
FIG. 10 is a view to explain a foil collecting step in the embodiment.

Concretely, as shown in FIG. 10, a press part 4c of the foil collecting device 3 placed outside of the first metal welding portion 44c in the first radial direction (on an upper side in FIG. 10) is moved inward in the first radial direction (downward in FIG. 10) toward the first metal winding part 44. In sync with this, a press part 4b of the foil collecting device 3 placed outside of the first metal welding portion 44b in the first radial direction (on a lower side in FIG. 10) is moved inward in the first radial direction (upward in FIG. 10).

Figure 11:
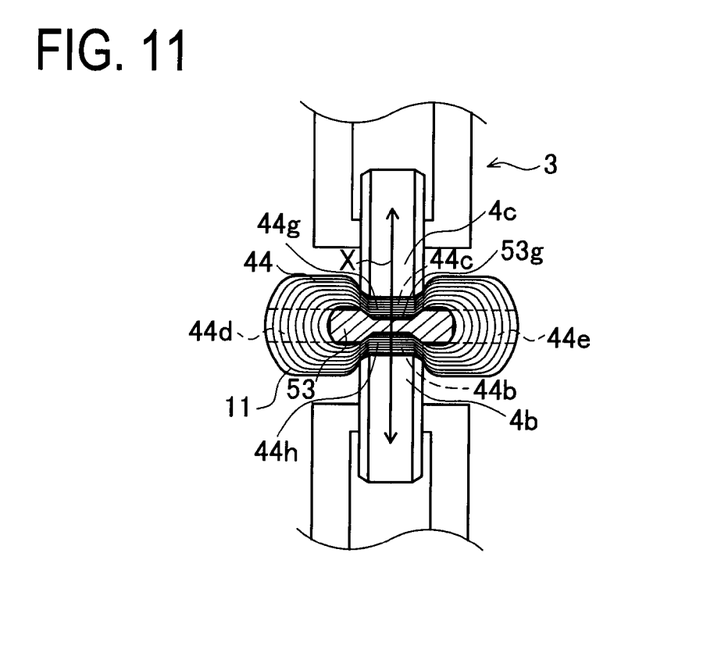
FIG. 11 is another view to explain the foil collecting step in the embodiment.

As shown in FIG. 11, accordingly, the pair of first metal welding portions 44b and 44c are pressed inward in the first radial direction, thereby closely collecting parts of the first metal foil 11 forming the first metal welding portions 44b and 44c inward in the first radial direction by decreasing clearances between the parts of the first metal foil 11 in the first radial direction X.

Before the resistance welding mentioned later, therefore, the parts of the first metal foil 11 forming each of the first metal welding portions 44b, 44c are collected inward in the first radial direction by decreasing the clearances between the parts of the metal foil 11 in the first radial direction X, so that the resistance welding can be appropriately performed. In the later resistance welding step, particularly, when the first metal welding portions 44b and 44c are respectively pressed inward in the first radial direction, the first metal winding part 44 is unlikely to be deformed and therefore the first metal foil 11 can be further prevented from buckling.

In the deforming step, before the foil collecting step, the parts of the first metal foil 11 forming each of the first metal perpendicularly intersecting portions 44d and 44e are moved outward in the second radial direction. In the foil collecting step, accordingly, when the first metal welding portions 44b and 44c are pressed inward in the first radial direction, the parts of the first metal foil 11 forming the first metal perpendicularly intersecting portions 44d and 44e can be easily moved together outward in the second radial direction. Therefore, even in the foil collecting step, the first metal foil 11 can be prevented from buckling.

Meanwhile, in the foil collecting step, when the first metal welding portions 44b and 44c are respectively pressed inward in the first radial direction, decreasing the clearances between the parts of the first metal foil 11 forming each of the first metal welding portions 44b and 44c in the first radial direction X to collect the parts of the first metal foil 11 inward in the first radial direction, the parts of the first metal foil 11 forming each of the first metal welding portions 44b and 44c are apt to elastically move outward in the first radial direction due to spring back. Thus, the clearances between the parts of the first metal foil 11 are widened in the first radial direction.

In the present embodiment, however, as shown in FIG. 10, the first terminal welding part 53 is designed such that a portion to be welded to the first metal welding portions 44b and 44c of the first metal winding part 44 is formed as a recess 53g recessed inward in the first radial direction than other portions when viewed in section taken along a direction perpendicular to the axis line P while the first terminal welding part 53 is placed on the radial inside of the first metal winding part 44. As shown in FIG. 11, the first metal welding portions 44b and 44c are pressed inward in the first radial direction to be brought in pressure contact with the recess 53g of the first terminal welding part 53. Even after the first metal foil 11 causes outward spring-back in the first radial direction, the parts of the first metal foil 11 forming each of the first metal welding portions 44b and 44c can be appropriately collected inward in the first radial direction.

In the foil collecting step of the present embodiment, furthermore, not only the first metal welding portions 44b and 44c but also the entire of recess-corresponding metal portions 44g (a region hatched with broken lines in FIG. 6) and 44h of the first metal winding part 44 each of which faces the recess 53g of the first terminal welding part 53 in the first radial direction X are pressed under pressure against the recess 53g of the first terminal welding part 53. Concretely, the press parts 4b and 4c of the foil collecting device 3 press the recess-corresponding metal portions 44g and 44h against the recess 53g of the first terminal welding part 53 and also the press parts 4b and 4c are moved in a direction along the axis line P (in a direction perpendicular to a drawing sheet of FIG. 11). In this way, the parts of the first metal foil 11 forming the first metal welding portions 44b and 44c can be more appropriately collected inward in the first radial direction and also the parts of the first metal foil 11 forming the recess-corresponding metal portions 44g and 44h can be collected inward in the first radial direction. In the later resistance welding step, accordingly, when the first metal welding portions 44b and 44c are pressed inward in the first radial direction, the first metal winding part 44 is more unlikely to be deformed. This can further prevent the first metal foil 11 from buckling.

Figure 12:
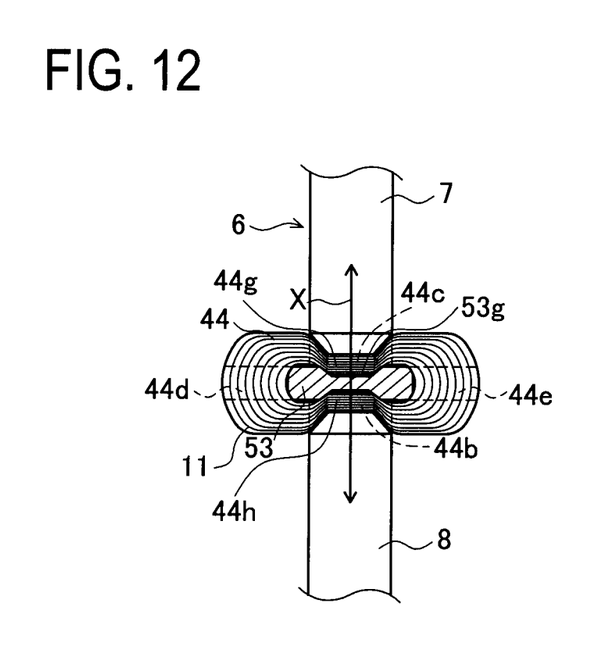
FIG. 12 is a view showing a state during resistance welding.

In the resistance welding step, subsequently, the first metal winding part 44 and the first terminal welding part 53 are resistance-welded to each other. Concretely, as shown in FIG. 12, a first electrode 7 and a second electrode 8 of a resistance welding machine 6 press the first metal welding portions 44b and 44c inward in the first radial direction to bring the first metal welding portions 44b and 44c in pressure contact with the recess 53g of the first terminal welding part 53. In this state, electric current is supplied between the first electrode 7 and the second electrode 8, thereby resistance-welding the first metal welding portions 44b and 44c to the first terminal welding part 53.

In the present embodiment, as mentioned above, in the deforming step and the foil collecting step, the parts of the first metal foil 11 forming the first metal winding part 44 are prevented from buckling. In the resistance welding step, furthermore, even when the first metal welding portions 44b and 44c are brought into pressure contact with the recess 53g of the first terminal welding part 53, the parts of the first metal foil 11 forming the first metal winding part 44 can be prevented from buckling. This can prevent the occurrence of spatters during resistance welding and hence avoid adhesion of foreign matters to the electrode body 40 caused by the occurrence of spatters. The use of this electrode body 40 can therefore restrain entrance of the foreign matters into the battery. Moreover, it is possible to prevent welding failures between the first metal welding portions 44b and 44c and the first terminal welding part 53 due to a shunt of welding current.

Figure 13:
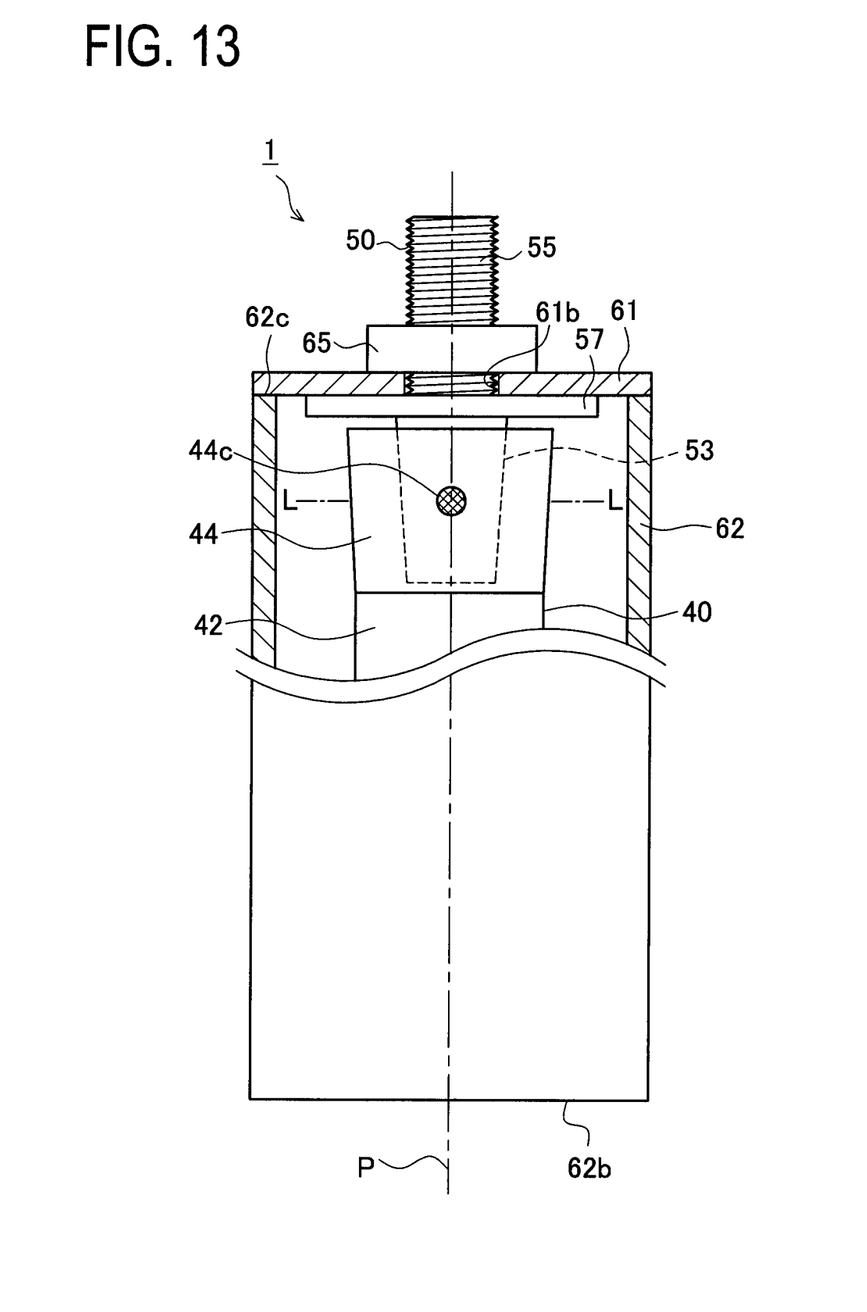
FIG. 13 is a view of a battery in the embodiment.

As shown in FIG. 13, thereafter, a disc-shaped lid member 61 is prepared and placed on the flange part 57 of the first current collecting terminal member 50 so that the screw part 55 of the terminal member 50 is inserted in a through hole 61b of the lid member 61. In this state, a nut 65 is threaded on the screw part 55 of the terminal member 50 to fasten the lid member 61 to the flange part 57 of the terminal member 50. Then, an electrolyte is poured in a battery case 62.

Subsequently, the electrode body 40 is inserted in the battery case 62 having a bottom-closed cylindrical shape and also the lid member 61 is put on an open end face 62c of the battery case 62 to close the opening of the battery case 62. It is to be noted that an electrical insulating member not shown is placed between the open end face 62c of the battery case 62 and the lid member 61 to electrically insulate between the lid member 61 and the battery case 62. When the opening of the battery case 62 is closed with the lid member 61, a second current collecting terminal member (not shown) welded to the second metal winding part 46 contacts with a bottom 62b of the battery case 62. Accordingly, the battery case 62 serves as a second electrode.

Thereafter, the lid member 61 and the battery case 62 are welded to each other. The battery in this embodiment is thus completed.

Figure 14:
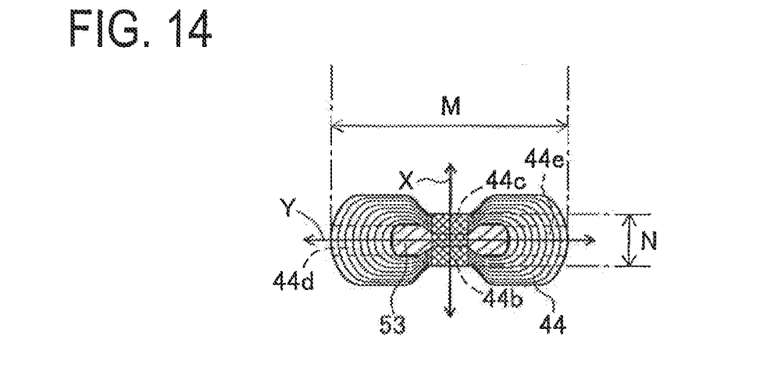
FIG. 14 is a sectional view of the first metal winding part of the battery, taken along a line L-L in FIG. 13.

In relation to the battery 1 of the present embodiment, FIG. 14 shows a sectional view of the first metal winding part 44 taken along a direction perpendicular to the axis line P so as to pass the first metal welding portion 44c. This view corresponds to a sectional view taken along a line L-L in FIG. 13. As shown in FIG. 14, the first terminal welding part 53 placed on the radial inside of the first metal winding part 44 and the first metal welding portions 44b and 44c of the first metal winding part 44 are resistance-welded to each other. In addition, an outside diameter N of the first metal winding part 44 in the first radial direction X in which the first metal welding portion 44b faces the first metal welding portion 44c is determined to be smaller than an outside diameter M of the first metal winding part 44 in the second radial direction Y perpendicular to the first radial direction X. In such battery, conventionally, a first metal foil would buckle at first metal perpendicularly intersecting portions (portions opposed to each other in the second radial direction perpendicular to the first radial direction) of the first metal winding part.

On the other hand, in the battery 1 of the present embodiment, as shown in FIG. 14, each part of the first metal foil 11 forming the first metal perpendicularly intersecting portions 44d and 44e is curved to outward bulge in the second radial direction Y. In other words, in the first metal perpendicularly intersecting portions 44d and 44e, the first metal foil 11 does not buckle. Accordingly, when the first metal welding portions 44b and 44c are resistance-welded to the first terminal welding part 53, it is possible to prevent adhesion of foreign matters to the electrode body 40 caused by the occurrence of spatters and prevent welding failures between the first metal welding portions 44b and 44c and the first terminal welding part 53 due to a shunt of welding current. Consequently, the battery 1 of the present embodiment can be provided as a highly reliable battery by restraining entrance of foreign matters into the battery and appropriately welding the first metal winding part 44 and the first terminal welding part 53 to each other.

Example 1 and Comparative Example 1

In Example 1, as mentioned in the embodiment, the deforming step, the foil collecting step, and the resistance welding step are sequentially performed to produce a hundred samples (Samples 1 to 100) in each of which the first metal winding part 44 and the first terminal welding part 53 are welded to each other, thereby welding the first current collecting terminal member 50 and the electrode body 40. The battery 1 is then produced in the manner described in the embodiment.

It is to be noted that, in Example 1, the first metal winding part 44 is designed to have fifty winding turns. The resistance welding step is conducted under the condition that a welding current value is 7000 A, a welding current application time is 116 ms, and a contact pressure between the first electrode 7 and the second electrode 8 is 100 kgf (980 N).

In Comparative example 1, a first metal winding part having fifty winding turns as with that in Example 1 is not subjected to the deforming step but is subjected to a foil collecting step different from Example 1 and then the resistance welding step as in Example 1. In this way, a hundred samples (Samples 101 to 200) in each of which the first current collecting terminal member and the electrode body are welded to each other are produced.

Figure 15:
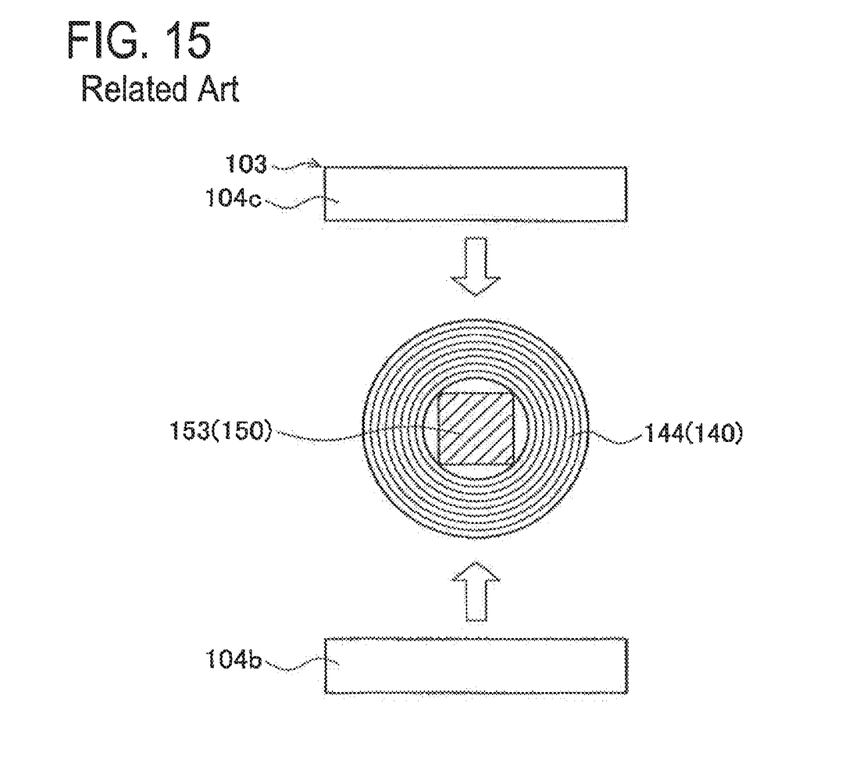
FIG. 15 is a view to explain a foil collecting step in Comparative example 1.

Concretely, a first current collecting terminal member 150 used in Comparative example 1 has a first terminal welding part 153 having an almost square pole shape whose cross section is almost square (its maximum size is equal to or less than the inside diameter of a first metal winding part 144) in a direction perpendicular to the axis line of the first metal winding part 144 wound in a cylindrical form, as shown in FIG. 15. Accordingly, even when the first terminal welding part 153 is inserted in the radial inside of the first metal winding part 144, the first metal winding part 144 will not be deformed.

Figure 16:
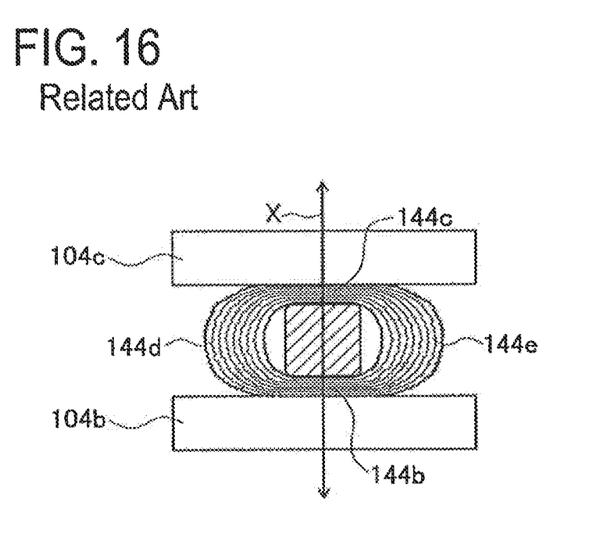
FIG. 16 is another view to explain the foil collecting step in Comparative example 1.

In the foil collecting step in Comparative example 1, furthermore, press parts 104b and 104c each having a flat plate shape and constituting a foil collecting device 103 are moved radially inward while the first terminal welding part 153 is placed on the radial inside of the first metal winding part 144 as shown in FIG. 15. Accordingly, as shown in FIG. 16, a pair of first metal welding portions 144b and 144c are pressed inward in the first radial direction, thereby collecting parts of the first metal foil forming the first metal welding portions 144b and 144c by decreasing clearances between the parts of the first metal foil in the first radial direction X. Then, the resistance welding step is conducted in the same manner as in Example 1 to produce samples 101 to 200.

The samples 101 to 200 in Comparative example 1 are examined about each welded state between each of the first metal welding portions 144b and 144c and the first terminal welding part 153. The result thereof shows that every welded state is appropriate. However, each electrode body 140 was examined about adhesion of foreign matters resulting from welding spatters, and adhesion of foreign matters was found in five samples.

On the other hand, the samples 1 to 100 in Example 1 are examined about each welded state between each of the first metal welding portions 44b and 44c and the first terminal welding part 53. The result thereof shows that every welded state is appropriate. Each electrode body 40 was examined about adhesion of foreign matters resulting from welding spatters, and no adhesion of foreign matters was found in each sample.

It is clear from the above results that the production method according to Example 1 can produce a highly reliable battery by preventing entrance of foreign matters into the battery and appropriately welding the first metal winding part and the first terminal welding part to each other. Furthermore, the battery 1 of Example 1 can be achieved as a highly reliable battery produced by preventing entrance of foreign matters into the battery and the first metal winding part and appropriately welding the first terminal welding part to each other.

The present invention is explained in the above embodiment and Example 1 but is not limited thereto. It should be understood that the present invention may be embodied in other specific forms without departing from the essential characteristics thereof.

The invention claimed is:

1. A method of producing a battery comprising an electrode body and a first current collecting terminal member,
   the electrode body being provided with:
   a first electrode sheet having a first electrode mixture layer provided on a surface of a strip-shaped first metal foil, the sheet including:
       a first electrode-forming portion extending along one side of the first metal foil extending in a longitudinal direction and including the first metal foil and the first electrode mixture layer; and
       a first metal portion extending adjacently to the first electrode-forming portion and along the one side along the longitudinal direction and consisting of the first metal foil without having the first electrode mixture layer;
   a strip-shaped second electrode sheet; and
   a strip-shaped separator,
   the electrode body including:
       a power generating part in which the first electrode-forming portion of the first electrode sheet and the second electrode sheet are laminated by interposing the separator therebetween and wound around an axis line into a cylindrical form; and
       a first metal winding part in which the first metal portion is wound, the first metal winding part being adjacent to the power generating part, and
   the first current collecting terminal member being configured to collect electric charge of the first electrode sheet and provided with a first terminal welding part placed on a radial inside of the first metal winding part and welded to the first metal winding part, the method comprising:

a deforming step of deforming the first metal winding part of the electrode body including: the power generating part; and the first metal winding part in which the first metal portion is wound in a cylindrical form, the deforming step including:

when a pair of portions of the first metal winding part to be welded to the first terminal welding part of the first current collecting terminal member, the portions being opposed to each other in a first radial direction of the first metal winding part, is a pair of first metal welding portions, and a pair of portions of the first metal winding part opposed to each other in a second radial direction perpendicular to the first radial direction is a pair of first metal perpendicularly intersecting portions, exerting an outward force in the second radial direction on the pair of metal perpendicularly intersecting portions to enlarge the inside diameter of the first metal winding part in the second radial direction and move parts of the first metal foil forming the pair of first metal perpendicularly intersecting portions outward in the second radial direction respectively, and a resistance welding step of pressing the pair of first metal welding portions inward in the first radial direction while the first terminal welding part of the first current collecting terminal member is placed on the radial inside of the deformed first metal winding part, and resistance-welding the first metal welding portions and the first terminal welding part to each other while holding the pair of first metal welding portions in pressure contact with the first terminal welding part, the first terminal welding part has a shape having such a cross section, taken along a direction perpendicular to the axis line while the first terminal welding part is placed on the radial inside of the first metal winding part, as that a maximum size in the second radial direction is larger than the inside diameter of the first metal winding part before deformed and a maximum size in the first radial direction is smaller than the inside diameter of the first metal winding part before deformed, and the deforming step including inserting the first terminal welding part in the radial inside of the first metal winding part, thereby exerting an outward force in the second radial direction on the pair of first metal perpendicularly intersecting portions to enlarge the inside diameter of the first metal winding part in the second radial direction and move the parts of the first metal foil forming the pair of the first metal perpendicularly intersecting portions respectively outward in the second radial direction and to decrease the inside diameter of the first metal winding part in the first radial direction and move the pair of the first metal welding portions inward in the first radial direction; and wherein the first terminal welding part has a cross section taken along the second radial direction so as to pass the axis line while the first terminal welding part is placed on the radial inside of the first metal winding part, the cross section having such a size in the second radial direction as that the size at a side closest to the power generating part is equal to or less than the inside diameter of the first metal winding part before deformed, the size increases as farther from the power generating part in the axis line direction, and the size at a farthermost side from the power generating part in the axis line direction is larger than the inside diameter of the first metal winding part before deformed.

2. The method of producing the battery according to claim 1, further comprising:

after the deforming step and before the resistance welding step, a foil collecting step of pressing the pair of first metal welding portions inward in the first radial direction while the first terminal welding part is placed on the radial inside of the deformed first metal winding part to collect parts of the first metal foil forming the first metal welding portions inward in the first radial direction while decreasing clearances between the parts of the first metal foil in the first radial direction.

3. The method of producing the battery according to claim 2, wherein the first terminal welding part has a shape formed with a portion recessed inward in the first radial direction as compared with other portions in a cross section taken along the direction perpendicular to the axis line while the first terminal welding part is placed on the radial inside of the first metal winding part, the recessed portion being to be welded to the first metal welding portions of the first metal winding part, and the foil collecting step includes pressing the first metal welding portions inward in the first radial direction to bring the first metal welding portions in pressure contact with the recessed portion of the first terminal welding part.

4. A method of producing a battery comprising an electrode body and a first current collecting terminal member, the electrode body being provided with:

a first electrode sheet having a first electrode mixture layer provided on a surface of a strip-shaped first metal foil, the sheet including:

a first electrode-forming portion extending along one side of the first metal foil extending in a longitudinal direction and including the first metal foil and the first electrode mixture layer; and a first metal portion extending adjacently to the first electrode-forming portion and along the one side along the longitudinal direction and consisting of the first metal foil without having the first electrode mixture layer;

a strip-shaped second electrode sheet; and a strip-shaped separator, the electrode body including:

a power generating part in which the first electrode-forming portion of the first electrode sheet and the second electrode sheet are laminated by interposing the separator therebetween and wound around an axis line into a cylindrical form; and a first metal winding part in which the first metal portion is wound, the first metal winding part being adjacent to the power generating part, and the first current collecting terminal member being configured to collect electric charge of the first electrode sheet and provided with a first terminal welding part placed on a radial inside of the first metal winding part and welded to the first metal winding part, the method comprising:

a deforming step of deforming the first metal winding part of the electrode body including: the power generating part; and the first metal winding part in which the first metal portion is wound in a cylindrical form, the deforming step including:

when a pair of portions of the first metal winding part to be welded to the first terminal welding part of the first current collecting terminal member, the portions being opposed to each other in a first radial direction of the first metal winding part, is a pair of first metal welding portions, and a pair of portions of the first metal winding part opposed to each other in a second radial direction perpendicular to the first radial direction is a pair of first metal perpendicularly intersecting portions, exerting an outward force in the second radial direction on the pair of metal perpendicularly intersecting portions to enlarge the inside diameter of the first metal winding part in the second radial direction and move parts of the first metal foil forming the pair of first metal perpendicularly intersecting portions outward in the second radial direction respectively, and a resistance welding step of pressing the pair of first metal welding portions inward in the first radial direction while the first terminal welding part of the first current collecting terminal member is placed on the radial inside of the deformed first metal winding part, and resistance-welding the first metal welding portions and the first terminal welding part to each other while holding the pair of first metal welding portions in pressure contact with the first terminal welding part, the first terminal welding part has a shape having such a cross section, taken along a direction perpendicular to the axis line while the first terminal welding part is placed on the radial inside of the first metal winding part, as that a maximum size in the second radial direction is larger than the inside diameter of the first metal winding part before deformed and a maximum size in the first radial direction is smaller than the inside diameter of the first metal winding part before deformed, and the deforming step including inserting the first terminal welding part in the radial inside of the first metal winding part, thereby exerting an outward force in the second radial direction on the pair of first metal perpendicularly intersecting portions to enlarge the inside diameter of the first metal winding part in the second radial direction and move the parts of the first metal foil forming the pair of the first metal perpendicularly intersecting portions respectively outward in the second radial direction and to decrease the inside diameter of the first metal winding part in the first radial direction and move the pair of the first metal welding portions inward in the first radial direction; and after the deforming step and before the resistance welding step, a foil collecting step of pressing the pair of first metal welding portions inward in the first radial direction while the first terminal welding part is placed on the radial inside of the deformed first metal winding part to collect parts of the first metal foil forming the first metal welding portions inward in the first radial direction while decreasing clearances between the parts of the first metal foil in the first radial direction; and wherein the first terminal welding part has a shape formed with a portion recessed inward in the first radial direction as compared with other portions in a cross section taken along the direction perpendicular to the axis line while the first terminal welding part is placed on the radial inside of the first metal winding part, the recessed portion being to be welded to the first metal welding portions of the first metal winding part, and the foil collecting step includes pressing the first metal welding portions inward in the first radial direction to bring the first metal welding portions in pressure contact with the recessed portion of the first terminal welding part.

* * * * *